United States Patent [19]

Minneman

[11] Patent Number: 5,067,750
[45] Date of Patent: Nov. 26, 1991

[54] COAXIAL CABLE SCREW CONNECTOR ATTACHMENT

[76] Inventor: Timothy A. Minneman, 7325 E. Heather Way, Everett, Wash. 98203

[21] Appl. No.: 446,350

[22] Filed: Dec. 5, 1989

[51] Int. Cl.⁵ .................................................. F16L 37/08
[52] U.S. Cl. ....................................... 285/38; 285/354; 285/921; 411/373; 411/431; 411/409
[58] Field of Search ................. 285/38, 921, 354, 386; 411/377, 373, 431, 429; 81/125, 409

[56] References Cited

U.S. PATENT DOCUMENTS

| | | | |
|---|---|---|---|
| 1,433,518 | 10/1922 | Kraft | 285/386 |
| 1,470,209 | 10/1923 | White | 285/38 |
| 1,618,723 | 2/1927 | Pearson | |
| 1,673,723 | 6/1928 | Van Arsdale | 285/38 |
| 1,677,622 | 7/1928 | Dreuil | |
| 2,449,121 | 9/1948 | Jones | 285/386 X |
| 2,733,937 | 2/1956 | Mowrer, Jr. | 285/1 |
| 2,966,083 | 12/1960 | Cheney | 81/90 |
| 3,527,478 | 9/1970 | Enssle | 81/125 |
| 3,810,073 | 5/1974 | Zajac et al. | 24/607 X |
| 4,482,368 | 11/1984 | Roberts | 411/435 X |

Primary Examiner—Peter M. Cuomo
Assistant Examiner—Heather Chun
Attorney, Agent, or Firm—Ward Brown; Robert W. Beach

[57] ABSTRACT

A one-piece plastic body has a central cavity of hexagonal cross section for receiving the hexagonal rotatable end portion of a standard screw connector of a coaxial cable. When inserted into the central cavity, the connector is snugly retained between a bottom flange or stop and upper inward-projecting lips. The attachment includes wings projecting oppositely from the attachment body and extending rearward along the coaxial cable for convenient grasping by a user.

9 Claims, 1 Drawing Sheet

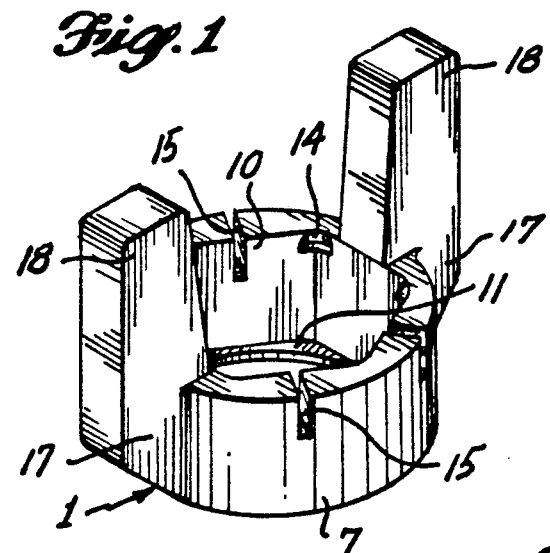
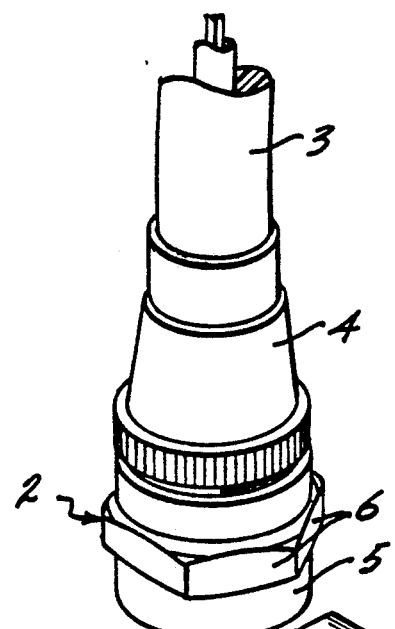
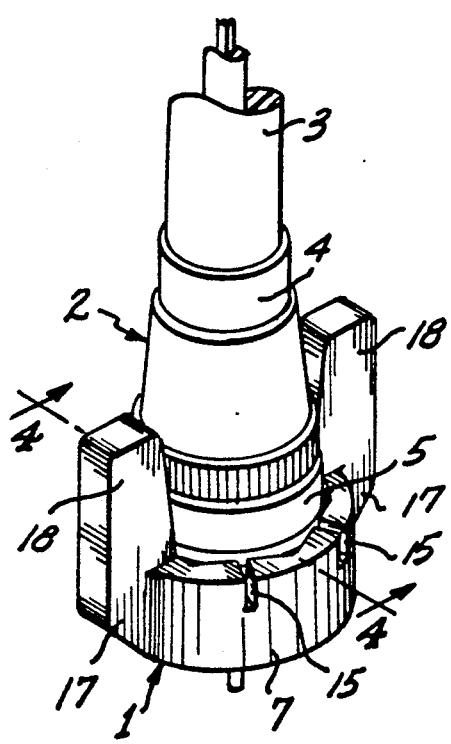
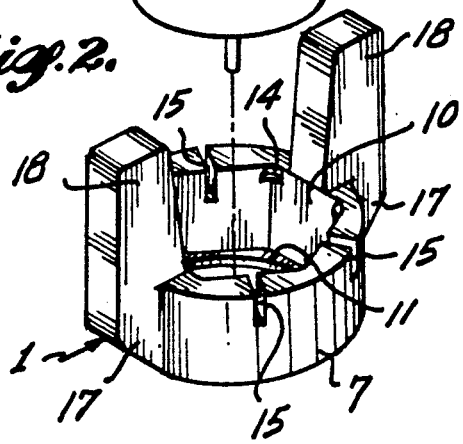
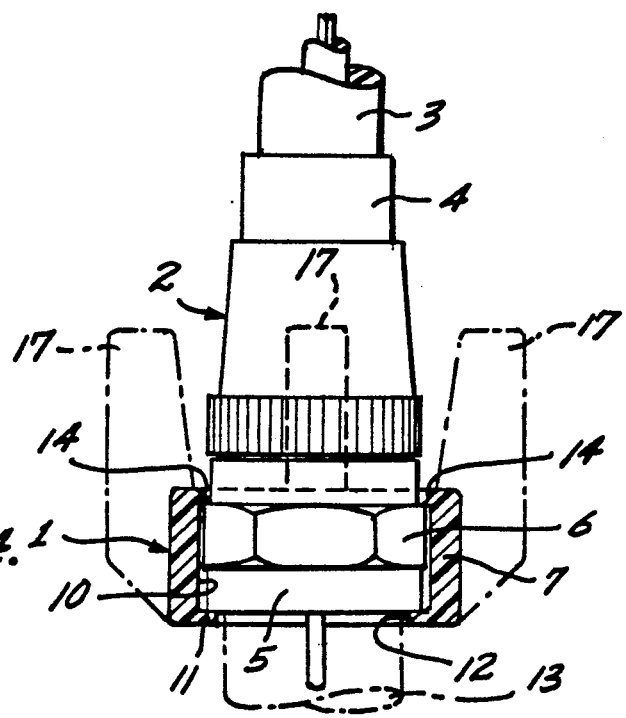

COAXIAL CABLE SCREW CONNECTOR ATTACHMENT

BACKGROUND OF THE INVENTION

1. Field of the Invention

The present invention relates to an attachment for a screw type end connector of a coaxial cable to allow more convenient manipulation of the end connector.

2. Prior Art

Standard screw type, female, end connectors for coaxial cables are small and can be difficult to manipulate, particularly if access to the mating stud or male connector is limited. For example, it can be difficult to align the internally threaded female end connector with an externally threaded stud and maintain the necessary alignment while turning the female connector. Similarly, after a secure tight fit has been achieved and it is desired to disconnect the female connector from the stud, it can be difficult to obtain a good grip on the small female connector to unscrew it from the stud. Push-on connectors can be more convenient to use but do not achieve as reliable a connection.

SUMMARY OF THE INVENTION

The principal object of the present invention is to provide mechanism of simple inexpensive construction and easy to use which permits more convenient joining of a standard female screw type end connector of a coaxial cable to a male connector or a stud.

In the preferred embodiment of the present invention, the foregoing object is accomplished by providing a winged attachment having a central cavity of a cross section complemental to the cross section of the female screw connector. Such attachment is insertable over the rotatable end portion of the connector. A bottom flange of the attachment limits insertion of the connector into the central cavity. Inwardly projecting lips of the attachment are positioned to engage over corners of the rotatable end portion of the connector for a reliable but manually disconnectible snap fit of the attachment on the connector. Oppositely projecting wings of the attachment extend outward and rearward along the base or collar portion of the connector for more convenient manual access by the user and for easier turning of the screw connector for joining it to or disconnecting it from a male connector or a stud.

BRIEF DESCRIPTION OF THE DRAWINGS

FIG. 1 is a top perspective of a coaxial cable screw connector attachment in accordance with the present invention.

FIG. 2 is a somewhat diagrammatic top perspective of the screw connector of FIG. 1 and the end portion of a coaxial cable having a standard end connector in position for insertion into such attachment; and FIG. 3 is a corresponding top perspective showing the end connector inserted into the attachment.

FIG. 4 is a somewhat diagrammatic section along line 4—4 of FIG. 3.

DETAILED DESCRIPTION

With reference to the drawings, the attachment 1 in accordance with the present invention is usable with a standard screw type end connector 2 of a standard coaxial cable 3. The end connector has a base portion or collar 4 crimped on or otherwise stationarily affixed to the end of the coaxial cable. Collar 4 carries the rotatable end portion 5 of the connector. Such end portion has internal threads and flattened external sides 6 of standard hex configuration. Sides 6 project outward from the otherwise cylindrical periphery of the rotatable connector portion 5. The small size of the connector can make it difficult to grip, rotate and manipulate, such as when it is desired to join the female connector to an externally threaded male connector or a stud of electronic equipment or accessories.

In the preferred embodiment, the attachment 1 in accordance with the present invention includes a thin-walled body 7 of plastic material having a central cavity 10 of hexagonal cross section, complemental to the hexagonal periphery of the rotatable end portion 5 of the connector 2. The maximum inside diameter of the central cavity 10 is approximately the same or slightly larger than the maximum outside diameter of the rotatable connector portion 5, enabling the connector to be inserted into such cavity. As best seen in FIG. 4, a narrow inward-projecting bottom flange or stop 11 limits insertion of the connector into the attachment cavity 10. Nevertheless, flange 11 forms a large circular opening 12 so as not to interfere with insertion of an externally threaded male connector or stud 13 through such opening for interconnection with the rotatable end portion 5 of the connector 2.

At each corner of the cavity 10, there is a short inward-projecting lip 14 positioned to engage over a flattened side 6 of the connector end portion 5. Preferably, the top surfaces of such lips 14 are beveled downward and inward to guide and ease insertion of the connector 2 into the cavity 10 of the attachment. Inward movement of the connector into the attachment wedges the lips 14 outward and forces the sidewalls of the attachment apart. The attachment can be formed with slots 15 extending from the top of the attachment body toward the flanged bottom to permit resilient outward spreading of the sidewalls. When the connector is inserted all the way into the central cavity of the attachment, the lips 14 engage over the flattened sides 6 for a snug snap fit of the connector rotatable end portion 5 in the attachment. Similarly, although the attachment is intended to remain joined to the connector, the attachment can be removed by simply pulling the connector and attachment apart. The short lips 14 normally maintain the connector and attachment joined, but do not prevent their manual disconnection.

In the preferred embodiment shown in the drawings, integral wings 17 project a short distance outward from opposite sides of the attachment. Such wings include rear end portions 18 extending along but spaced outward from the stationary collar 4 of the connector. Preferably, the wings project radially outward from the connector a distance no greater than the radius of the rotatable connector portion 5 so as not to interfere with any adjacent connector-attachment assemblies. The end portions 18 of the wings extend rearward from the body 7 of the attachment a distance at least as great as the axial height of the body for convenient access by the user.

When it is desired to join the female connector 2 to a male connector or stud, or to disconnect joined components, the user can conveniently grasp the wing portions 18 adjacent to the connector collar 4 rather than having to reach to the small rotatable portion 5 of the connector, and can easily exert the force required to screw or unscrew the connector.

I claim:

1. In a fitting assembly including a coaxial cable having an end and a female connector having a collar portion affixed to the end of the coaxial cable and an internally threaded portion rotatably mounted on and carried by such collar portions and opening away from such end of the coaxial cable for reception of an externally threaded male coaxial fitting component therein, such internally threaded rotatable portion of such female connector having outward projecting flattened sides forming a noncircular outer periphery, the improvement comprising an attachment fittable on the female connector and including a body having a central cavity of a shape complemental to the noncircular outer periphery of the female connector rotatable portion for reception of the female connector rotatable portion in said central cavity in nonrotative relationship relative thereto, said attachment body having an end opening of a size and positioned so as not to interfere with passage of the externally threaded male component therethrough for reception in the internally threaded rotatable female connector portion, said body further having stop means for limiting insertion of the female connector rotatable portion into said body central cavity and a lip projecting inward into said central cavity which lip is positioned to engage over the outward-projecting flattened sides of the rotatable portion of the female connector when fitted into said central cavity of said attachment body against said stop means for normally retaining the female connector rotatable portion in said central cavity, and grasping means projecting from said body for manual grasping and turning thereof to turn said body and thereby turn said female connector rotatable portion.

2. In the assembly defined in claim 1, the outer periphery of the female connector rotatable portion being of hexagonal cross section and the central cavity of the attachment body being of hexagonal cross section of a size no more than slightly greater than the size of the outer periphery of the female connector rotatable portion for snug reception of the female connector rotatable portion in the attachment central cavity.

3. In the assembly defined in claim 1, the lip being beveled inward into the central cavity for guiding and easing insertion of the female connector rotatable portion into such cavity.

4. In the assembly defined in claim 1, the body having sidewall portions surrounding the central cavity, said sidewall portions having slots extending from one end of the body toward the stop means and positioned adjacent to the lip for permitting resilient outward spreading of the sidewall portions of the body as the flattened sides of the rotatable connector portion are fitted past the lip during insertion of the female connector rotatable portion into the central cavity.

5. In the assembly defined in claim 1, the grasping means including at least one wing extending outward from the body.

6. In the assembly defined in claim 5, the wing extending outward from the body a distance no greater than the radius of the female connector rotatable portion.

7. In the assembly defined in claim 6, the wing including an end portion extending rearward from the attachment body alongside but spaced outward from the collar portion of the female connector.

8. In a fitting assembly including a coaxial cable having an end and a female connector having a collar portion affixed to the end of the coaxial cable and an internally threaded portion rotatably mounted on and carried by such collar portion and opening away from such end of the coaxial cable for reception of an externally threaded male coaxial fitting component therein, the improvement comprising said female connector having outward projecting flattened sides forming a noncircular outer periphery an attachment fitting o the female connector and including a body having a central cavity for reception of the female connector rotatable portion in said central cavity, said central cavity of said body being of a shape complemental to the noncircular outer periphery of the female connector rotatable portion for nonrotative reception of the female connector rotatable portion in the body central cavity, said body having an end opening of a size and positioned so as not to interfere with passage of the externally threaded male component therethrough for reception in the internally threaded female connector portion, and grasping means projecting from said body for manual grasping and turning thereof to turn said body and thereby turn said female connector rotatable portion, said grasping means including at least one wing extending outward from the body a distance no greater than the radius of the female connector rotatable portion.

9. In the assembly defined in claim 8, the wing including an end portion extending rearward from the attachment body alongside but spaced outward from the collar portion of the female connector.

* * * * *